(12) United States Patent
Yin et al.

(10) Patent No.: US 9,674,774 B2
(45) Date of Patent: Jun. 6, 2017

(54) METHOD AND DEVICE FOR BINDING INFORMATION

(71) Applicant: ZTE Corporation, Shenzhen (CN)

(72) Inventors: Baoyu Yin, Shenzhen (CN); Tingyao Jia, Shenzhen (CN); Chunya Zou, Shenzhen (CN); Chunming Wu, Shenzhen (CN); Shuisheng Wu, Shenzhen (CN); Zefeng Miao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/107,602

(22) PCT Filed: Jul. 22, 2014

(86) PCT No.: PCT/CN2014/082752
§ 371 (c)(1),
(2) Date: Jun. 23, 2016

(87) PCT Pub. No.: WO2015/117294
PCT Pub. Date: Aug. 13, 2015

(65) Prior Publication Data
US 2016/0337948 A1 Nov. 17, 2016

(30) Foreign Application Priority Data

Feb. 10, 2014 (CN) .......................... 2014 1 0046638

(51) Int. Cl.
*H04W 48/16* (2009.01)
*H04W 24/02* (2009.01)
(Continued)

(52) U.S. Cl.
CPC ............. *H04W 48/16* (2013.01); *H04L 41/08* (2013.01); *H04W 24/02* (2013.01); *H04W 24/04* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2002/0095487 A1* | 7/2002 | Day | ........................ H04L 29/06 709/223 |
| 2005/0246436 A1* | 11/2005 | Day | ........................ H04L 29/06 709/223 |
| 2010/0061364 A1 | 3/2010 | Damola | |

FOREIGN PATENT DOCUMENTS

| | | |
|---|---|---|
| CN | 102652457 A | 8/2012 |
| CN | 103166771 A | 6/2013 |

(Continued)

OTHER PUBLICATIONS

International Search Report for corresponding application PCT/CN2014/082752 filed on Jul. 22, 2014; Mail date Nov. 19, 2014.

*Primary Examiner* — Diane Mizrahi
(74) *Attorney, Agent, or Firm* — Cantor Colburn LLP

(57) ABSTRACT

The embodiments of disclosure disclose a method and device for binding information. In the method, when an HGW is in a power-on state, first identification information from an subordinate device of the HGW is received; when it is determined that the HGW executes a BOOT operation and a business worksheet corresponding to the subordinate device of the HGW exists currently, second identification information is acquired from the HGW, wherein the second identification information is relevant configuration information which is registered in the HGW when the subordinate device of the HGW is connected to the HGW in the power-on state; and after the first identification information (Continued)

is successfully matched with the second identification information, logical identification information of the HGW is bound with the first identification information.

16 Claims, 2 Drawing Sheets

(51) Int. Cl.
*H04L 12/24* (2006.01)
*H04W 24/04* (2009.01)
*H04W 88/16* (2009.01)

(56) References Cited

FOREIGN PATENT DOCUMENTS

| CN | 103188109 A | 7/2013 |
|---|---|---|
| WO | 2013185595 A1 | 12/2013 |

* cited by examiner

METHOD AND DEVICE FOR BINDING INFORMATION

TECHNICAL FIELD

The disclosure relates to the communications field, and in particular to a method and device for binding information.

BACKGROUND

Nowadays, in a case of wide emergence of high-speed home networks, a management of a home network device is increasingly important. Currently, a protocol used for managing a large number of Home Gateways (HGW) mainly adopts a wide area network management protocol for Customer Premise Equipment (CPE) numbered as Tr069. Compared with a protocol previously adopted in the related art, the protocol has the following characteristics:

1, the protocol has a strict data model definition, thereby enabling various different types of devices from different manufacturers to be managed uniformly;

2, conversational interaction can effectively reduce performance costs consumed by server management devices, thereby making massive device management come true gradually; and 3, management devices are actively connected, a server is passively configured, and therefore performance costs of the management devices can be further reduced.

Early in 2009, flows for implementing binding between physical device information and worksheet configuration information had been widely adopted by various operators. Compared with previous implementation flows, these flows have obvious advantages. As a binding relationship between a device and a user can be determined during a installation of the device, a flexibility in the flows is remarkably improved, thereby avoiding risks caused by non-matching of devices. The most important flow thereamong refers to customizing a special event on an HGW and reporting logical identification information of the device so as to achieve special management for the device. However, this mode can be implemented by strong promotion of an operator and customization cooperation of a device manufacturer, disadvantageously. Currently, China Telecom has been able to maturely adopt this flow to bind HGWs.

However, due to the difference of development phases, a subordinate device of the HGW (that is, a device in charge of managing the HGW) has not customized a binding implementation function so far. Thus, how to successfully open a business of the subordinate device of the HGW in a family that has opened an HGW business has become a big problem. As logical identification information of the HGW cannot be bound with identification information of the subordinate device of the HGW in the related art, it is necessary to upgrade an existing entire network device in order to be capable of opening the business of the subordinate device of the HGW. But, this mode is higher in cost and complicated in operation.

SUMMARY

The embodiments of disclosure provide a method and device for binding information, so as to at least solve a problem in the related art that logical identification information of an HGW cannot be bound with identification information of a subordinate device of the HGW.

In one embodiment of the disclosure, a method for binding information is provided.

The method for binding information according to an embodiment of the disclosure may include that: when a Home Gateway (HGW) is in a power-on state, receiving first identification information from an subordinate device of the HGW; when determining that the HGW executes a BOOT operation and a business worksheet corresponding to the subordinate device of the HGW exists currently, acquiring second identification information from the HGW, wherein the second identification information is relevant configuration information which is registered in the HGW when the subordinate device of the HGW is connected to the HGW in the power-on state; and after the first identification information is successfully matched with the second identification information, binding logical identification information of the HGW with the first identification information.

In an example embodiment, determining that the HGW executes the BOOT operation and the business worksheet exists currently includes: receiving a BOOT power-on message reported by the HGW, wherein the BOOT power-on message is triggered in a case that the HGW executes the BOOT operation, and the BOOT power-on message carries a Sequence Number (SN) of the HGW; searching for the logical identification information according to the SN; and acquiring the business worksheet according to the logical identification information.

In an example embodiment, acquiring the second identification information from the HGW includes: sending an instruction for acquiring a Media Access Control (MAC) address of the subordinate device of the HGW to the HGW; and receiving the MAC address returned by the HGW.

In an example embodiment, binding the logical identification information with the first identification information after the first identification information is successfully matched with the second identification information includes: matching the MAC address acquired from the HGW with an MAC address, which is registered by the subordinate device of the HGW in the HGW; and when a matching result is that the MAC address acquired from the HGW is matched with the MAC address registered by the subordinate device of the HGW, binding the MAC address of the subordinate device of the HGW with the logical identification information.

In an example embodiment, before the second identification information is acquired from the HGW, the method further includes: receiving the business worksheet sent by a Business Support System (BSS), wherein information carried in the business worksheet includes: the logical identification information; and storing the business worksheet.

In another embodiment of the disclosure, a device for binding information is provided.

The device for binding information according to another embodiment of the disclosure may include:

a first receiving component, configured to receive, when a Home Gateway (HGW) is in a power-on state, first identification information from an subordinate device of the HGW; an acquisition component, configured to acquire, when it is determined that the HGW executes a BOOT operation and a business worksheet corresponding to the subordinate device of the HGW exists currently, second identification information from the HGW, wherein the second identification information is relevant configuration information which is registered in the HGW when the subordinate device of the HGW is connected to the HGW in the power-on state; and a binding component, configured to bind, after the first identification information is successfully matched with the second identification information, logical identification information of the HGW with the first identification information.

In an example embodiment, the acquisition component includes: a first receiving element, configured to receive a BOOT power-on message reported by the HGW, wherein the BOOT power-on message is triggered in a case that the HGW executes the BOOT operation, and the BOOT power-on message carries a Sequence Number (SN) of the HGW; a searching element, configured to search for the logical identification information according to the SN; and an acquisition element, configured to acquire the business worksheet according to the logical identification information.

In an example embodiment, the acquisition component includes: a sending element, configured to send an instruction for acquiring a Media Access Control (MAC) address of the subordinate device of the HGW to the HGW; and a second receiving element, configured to receive the MAC address returned by the HGW.

In an example embodiment, the binding component includes: a matching element, configured to match the MAC address acquired from the HGW with an MAC address, which is registered by the subordinate device of the HGW in the HGW; and a binding element, configured to bind, when a matching result is that the MAC address acquired from the HGW is matched with the MAC address registered by the subordinate device of the HGW, the MAC address of the subordinate device of the HGW with the logical identification information.

In an example embodiment, further including: a second receiving component, configured to receive the business worksheet sent by a Business Support System (BSS), wherein information carried in the business worksheet includes: the logical identification information; and a storage component, configured to store the business worksheet.

By means of the embodiments of the disclosure, when the HGW is in the power-on state, the first identification information is received from the subordinate device of the HGW; when it is determined that the HGW executes the BOOT operation and the business worksheet corresponding to the subordinate device of the HGW exists currently, the second identification information is acquired from the HGW, wherein the second identification information is relevant configuration information which is registered in the HGW when the subordinate device of the HGW is connected to the HGW in the power-on state; and after the first identification information is successfully matched with the second identification information, the logical identification information of the HGW is bound with the first identification information. That is, it is only necessary to add the BOOT operation for the HGW on the basis of an original flow so as to trigger identification information, indicating that the subordinate device of the HGW has been registered, to be matched with registration information, acquired from the HGW, about registration of the subordinate device of the HGW on the HGW, and the logical identification information of the HGW can be bound with the identification information of the subordinate device of the HGW, thereby solving the problem in the related art that the logical identification information of the HGW cannot be bound with the identification information of the subordinate device of the HGW. As the logical identification information of the HGW can be bound with the identification information of the subordinate device of the HGW, when a business of the subordinate device of the HGW is opened, it is unnecessary to reform an existing network or to upgrade the HGW and the existing subordinate device, thereby obtaining a low implementation cost and a simple operation mode.

BRIEF DESCRIPTION OF THE DRAWINGS

The drawings described here are intended to provide further understanding of the disclosure, and form a part of the disclosure. The schematic embodiments and descriptions of the disclosure are intended to explain the disclosure, and do not form improper limits to the disclosure. In the drawings.

DETAILED DESCRIPTION

The disclosure is described below with reference to the drawings and the embodiments in detail. It needs to be noted that the embodiments of the disclosure and the characteristics in the embodiments can be combined under the condition of no conflicts.

Figure 1:
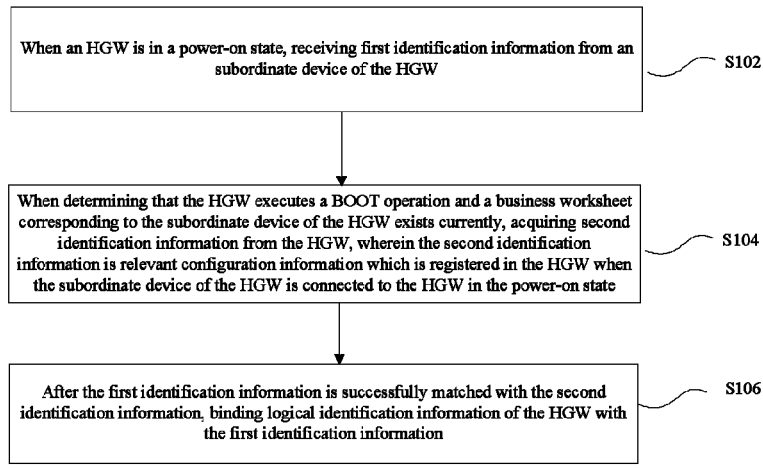
FIG. 1 is a flowchart of a method for binding information according to an embodiment of the disclosure.

FIG. 1 is a flowchart of a method for binding information according to an embodiment of the disclosure. As shown in FIG. 1, the method may include the steps as follows.

Step S102: When an HGW is in a power-on state, first identification information from a subordinate device of the HGW is received.

Step S104: When it is determined that the HGW executes a BOOT operation and a business worksheet corresponding to the subordinate device of the HGW exists currently, second identification information is acquired from the HGW, wherein the second identification information is relevant configuration information which is registered in the HGW when the subordinate device of the HGW is connected to the HGW in the power-on state.

Step S106: After the first identification information is successfully matched with the second identification information, logical identification information of the HGW is bound with the first identification information.

The logical identification information of the HGW cannot be bound with the identification information of the subordinate device of the HGW in the related art. By means of the method as shown in FIG. 1, it is only necessary to add the BOOT operation for the HGW on a basis of an original flow so as to trigger identification information, indicating that the subordinate device of the HGW has been registered, to be matched with registration information, acquired from the HGW, about registration of the subordinate device of the HGW on the HGW, and the logical identification information of the HGW can be bound with the identification information of the subordinate device of the HGW, thereby solving the problem in the related art that the logical identification information of the HGW cannot be bound with the identification information of the subordinate device of the HGW. As the logical identification information of the HGW can be bound with the identification information about the subordinate device of the HGW, when the business of the subordinate device of the HGW is opened, it is unnecessary to reform an existing network or to upgrade the HGW and the existing subordinate device, thereby obtaining a low implementation cost and a simple operation mode.

It needs to be noted that the subordinate device of the HGW may include: a Set Top Box (STB), a video camera and various wirelessly-connected terminal devices such as a mobile phone and a tablet personal computer. That is, businesses of all devices connected to the HGW in a wired or wireless manner can be opened by means of the technical solution provided in the embodiments of the disclosure.

In an example embodiment, the subordinate device of the HGW (for example, an STB) is connected to the HGW firstly, the subordinate device of the HGW is then powered on when it is ensured that the HGW is in an on-line state, and the subordinate device of the HGW will be automatically registered to an Auto-Configuration System (ACS). Registration information of the STB, taken as an example, may include: MAC control information and SN information.

In an example embodiment, in Step S104, the operation that it is determined that the HGW executes the BOOT operation and the business worksheet exists currently may include the operations as follows.

Step S1: A BOOT power-on message reported by the HGW is received, wherein the BOOT power-on message is triggered in a case that the HGW executes the BOOT operation, and the BOOT power-on message carries an SN of the HGW.

Step S2: The logical identification information is searched according to the SN.

Step S3: The business worksheet is acquired according to the logical identification information.

After the HGW boots, the HGW will report a message carrying a BOOT event into the ACS. Information carried in the BOOT power-on message includes: the SN of the HGW. The ACS can find the logical identification information of the HGW according to the SN of the HGW, and then queries, according to the logical identification information, whether an unexecuted STB-related business exists.

In an example embodiment, in Step S104, the operation that the second identification information is acquired from the HGW may include that:

Step S4: an instruction for acquiring an MAC address of the subordinate device of the HGW is sent to the HGW; and Step S5: the MAC address returned by the HGW is received.

If the ACS finds the unexecuted STB-related business, the ACS will send an instruction for acquiring an MAC address of a subordinate STB to the HGW, and the HGW feeds the MAC address of the STB connected to the HGW back to the ACS.

In an example embodiment, in Step S106, the operation that the logical identification information is bound with the first identification information after the first identification information is successfully matched with the second identification information may include the operations as follows.

Step S6: The MAC address acquired from the HGW is matched with an MAC address, which is registered by the subordinate device of the HGW in the HGW.

Step S7: When a matching result is that the MAC address acquired from the HGW is matched with the MAC address registered by the subordinate device of the HGW, the MAC address of the subordinate device of the HGW is bound with the logical identification information.

In an example embodiment, the ACS can judge whether the business worksheet of the subordinate device of the HGW exists on the HGW according to a BOOT message reported by the HGW; if the business worksheet of the subordinate device of the HGW exists on the HGW, MAC address information of the subordinate device of the HGW is acquired from the HGW, and the acquired MAC address information is compared with MAC address information which has been stored in the ACS; and if the acquired MAC address information can be matched with the MAC address information of the subordinate device of the HGW which has been registered in the ACS, a binding operation between the MAC address information of the subordinate device of the HGW and the logical identification information of the HGW is completed. After the binding operation between the MAC address information of the subordinate device of the HGW and the logical identification information of the HGW is completed, the ACS can issue business worksheet information to the subordinate device of the HGW.

In an example embodiment, in Step S104, before the second identification information is acquired from the HGW, the method may further include that:

Step S8: the business worksheet sent by a BSS is received, wherein information carried in the business worksheet includes: the logical identification information; and Step S9: the business worksheet is stored.

In an example embodiment, the BSS sends the business worksheet to the ACS, wherein the business worksheet may include, but not limited to, the logical identification information about the HGW, and relevant information of a business, needing to be opened, of the subordinate device of the HGW (for example, the STB); and the ACS stores the received business worksheet.

An example implementation process is further described below with reference to a preferred implementation mode shown in FIG. 2.

Figure 2:
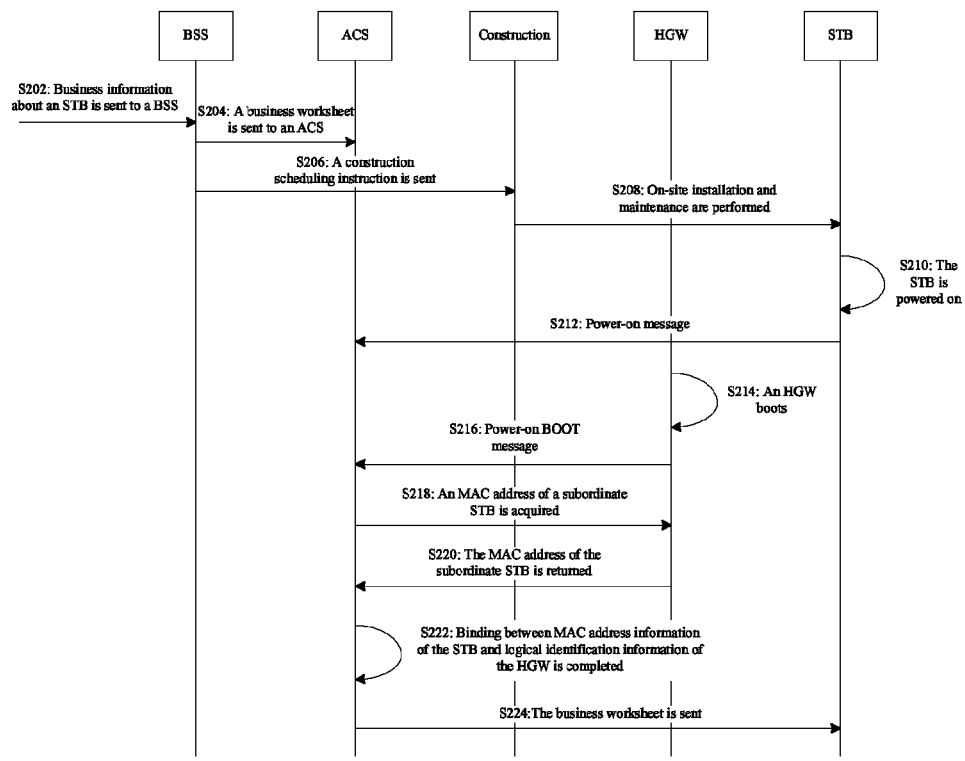
FIG. 2 is a flowchart of implementation of business opening for a subordinate device of the HGW according to an example embodiment of the disclosure.

FIG. 2 is a flowchart of implementation of business opening for a subordinate device of the HGW according to an example embodiment of the disclosure. As shown in FIG. 2, by taking an STB as an example, the flow may include the processing steps as follows.

Step S202: Business information of an STB is sent to a BSS by means of foreground business acceptance.

Step S204: The BSS sends a business worksheet to an ACS, wherein the business worksheet may include, but not limited to, logical identification information of an HGW, and relevant information of a business, needing to be opened, of the STB; and the ACS stores the received business worksheet.

Step S206: The BSS sends a construction scheduling instruction.

Step S208: A constructor performs on-site installation and maintenance in an STB user home.

Step S210: The STB is connected to the HGW and powered on, and after the STB is connected to the HGW, an MAC address of the STB can be registered on the HGW.

Step S212: The subordinate STB sends a power-on message to the ACS and is successfully registered to the ACS, wherein registration information of the STB may include: MAC address information (equivalent to the first identification information) and SN information.

Step S214: The HGW boots.

Step S216: The HGW reports a power-on BOOT message to the ACS, wherein information carried in the power-on BOOT message includes: an SN of the HGW. The ACS can find the logical identification information of the HGW according to the SN of the HGW, and then queries, according to the logical identification information, whether an unexecuted STB-related business exists.

Step S218: If the ACS finds the unexecuted STB-related business, the ACS will send an instruction for acquiring an MAC address (equivalent to the second identification information) of the subordinate STB to the HGW.

Step S220: The HGW feeds the MAC address of the STB connected to the HGW back to the ACS.

Step S222: The ACS compares acquired MAC address information with MAC address information which has been stored in the ACS; and if the acquired MAC address information can be matched with the MAC address information about the STB which has been registered in the ACS, a binding operation between the MAC address information of the STB and the logical identification information of the HGW is completed.

Step S224: The ACS sends business worksheet information to the STB.

Figure 3:
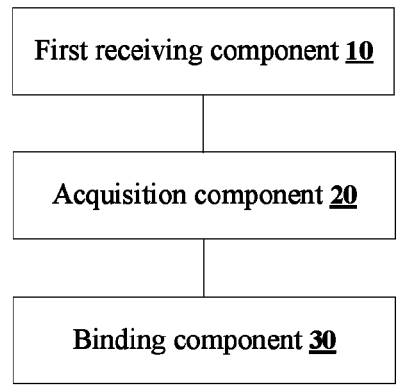
FIG. 3 is a structural block diagram of a device for binding information according to an embodiment of the disclosure.

FIG. 3 is a structure diagram of an information binding device according to an embodiment of the disclosure. As shown in FIG. 3, the information binding device may include: a first receiving component 10, configured to receive, when an HGW is in a power-on state, first identification information from a subordinate device of the HGW; an acquisition component 20, configured to acquire, when it is determined that the HGW executes a BOOT operation and a business worksheet corresponding to the subordinate device of the HGW exists currently, second identification information from the HGW, wherein the second identification information is relevant configuration information which is registered in the HGW when the subordinate device of the HGW is connected to the HGW in the power-on state; and a binding component 30, configured to bind, after the first identification information is successfully matched with the second identification information, logical identification information of the HGW with the first identification information.

By means of the device as shown in FIG. 3, the problem in the relevant art that the logical identification information about the HGW cannot be bound with the identification information about the subordinate device of the HGW is solved. As the logical identification information about the HGW can be bound with the identification information about the subordinate device of the HGW, when the business of the subordinate device of the HGW is opened, it is unnecessary to reform an existing network or to upgrade the HGW and the existing subordinate device, thereby obtaining a low implementation cost and a simple operation mode.

Figure 4:
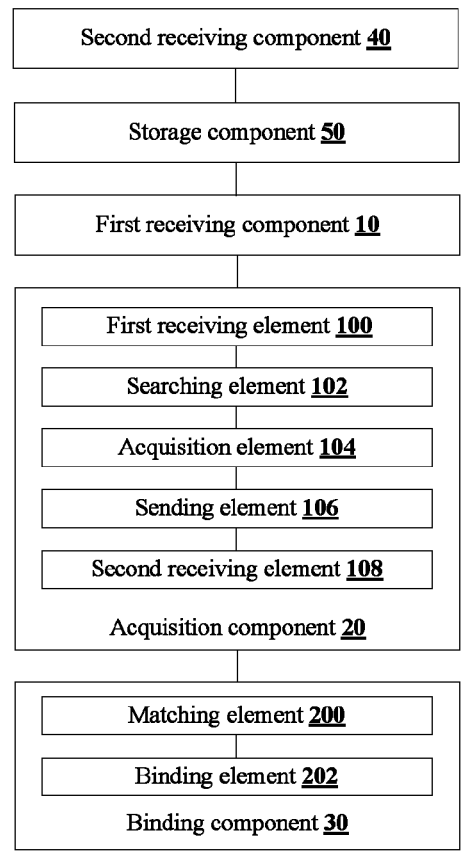
FIG. 4 is a structural block diagram of a device for binding information according to an example embodiment of the disclosure.

In an example embodiment, as shown in FIG. 4, the acquisition component 10 may include: a first receiving element 100, configured to receive a BOOT power-on message reported by the HGW, wherein the BOOT power-on message is triggered in a case that the HGW executes the BOOT operation, and the BOOT power-on message carries an SN of the HGW; a searching element 102, configured to search for the logical identification information according to the SN; and an acquisition element 104, configured to acquire the business worksheet according to the logical identification information.

In an example embodiment, as shown in FIG. 4, the acquisition component 10 may further include: a sending element 106, configured to send an instruction for acquiring an MAC address of the subordinate device of the HGW to the HGW; and a second receiving element 108, configured to receive the MAC address returned by the HGW.

In an example embodiment, as shown in FIG. 4, the binding component 20 may include: a matching element 200, configured to match the MAC address acquired from the HGW with an MAC address, which is registered by the subordinate device of the HGW in the HGW; and a binding element 202, configured to bind, if a matching result is that the MAC address acquired from the HGW is matched with the MAC address registered by the subordinate device of the HGW, the MAC address of the subordinate device of the HGW with the logical identification information.

In an example embodiment, as shown in FIG. 4, the device may further include: a second receiving component 40, configured to receive the business worksheet sent by a BSS, wherein information carried in the business worksheet includes: the logical identification information; and a storage component 50, configured to store the business worksheet.

From the above descriptions, it can be seen that the embodiments achieve the technical effects (it is important to note that these effects refer to effects which can be achieved by some preferred embodiments) as follows. The embodiments of the disclosure provide a method for opening an STB business without needing to upgrade an HGW, to upgrade an STB and to modify network configurations. The technical solution fully considers HGW account opening and business opening flows of various existing domestic operators, and it is only necessary to add a BOOT operation for the HGW on the basis of an original flow so as to automatically open a subordinate device business. Thus, issuing of a business worksheet of a subordinate device and binding between a logical identifier of the HGW and a physical device after an HGW business is opened are achieved, and it is unnecessary to involve changing of operator networks or to involve version upgrading of the subordinate device and the HGW.

Obviously, those skilled in the art shall understand that all components or all steps in the disclosure can be implemented by using a general calculation device, can be centralized on a single calculation device or can be distributed on a network composed of a plurality of calculation devices. Optionally, they can be implemented by executable program codes of the calculation devices. Thus, they can be stored in a storage device and executed by the calculation devices, the shown or described steps can be executed in a sequence different from this sequence under certain conditions, or they are manufactured into each integrated circuit component respectively, or a plurality of components or steps therein are manufactured into a single integrated circuit component. Thus, the disclosure is not limited to a combination of any specific hardware and software.

The above is only the example embodiments of the disclosure, and is not intended to limit the disclosure. There can be various modifications and variations in the disclosure for those skilled in the art. Any modifications, equivalent replacements, improvements and the like within the spirit and principle of the disclosure shall fall within the protection scope of the disclosure.

INDUSTRIAL APPLICABILITY

As mentioned above, the method and device for binding information provided by the embodiments of the disclosure have the beneficial effects as follows: HGW account opening and business opening flows of various existing domestic operators are fully considered, and it is only necessary to add a BOOT operation for an HGW on the basis of an original flow so as to automatically open a subordinate device business. Thus, sending of a business worksheet of a subordinate device and binding between a logical identifier of the HGW and a physical device after an HGW business is opened are achieved, and it is unnecessary to involve changing of operator networks or to involve version upgrading of the subordinate device and the HGW.

What is claimed is:

1. A method for binding information, comprising:
when a Home Gateway (HGW) is in a power-on state, receiving first identification information from an subordinate device of the HGW;
when determining that the HGW executes a BOOT operation and a business worksheet corresponding to the subordinate device of the HGW exists currently, acquiring second identification information from the HGW, wherein the second identification information is relevant configuration information which is registered in the HGW when the subordinate device of the HGW is connected to the HGW in the power-on state; and
after the first identification information is successfully matched with the second identification information, binding logical identification information of the HGW with the first identification information.

2. The method as claimed in claim 1, wherein determining that the HGW executes the BOOT operation and the business worksheet exists currently comprises:
receiving a BOOT power-on message reported by the HGW, wherein the BOOT power-on message is triggered in a case that the HGW executes the BOOT operation, and the BOOT power-on message carries a Sequence Number (SN) of the HGW;
searching for the logical identification information according to the SN; and
acquiring the business worksheet according to the logical identification information.

3. The method as claimed in claim 2, wherein acquiring the second identification information from the HGW comprises:
sending an instruction for acquiring a Media Access Control (MAC) address of the subordinate device of the HGW to the HGW; and
receiving the MAC address returned by the HGW.

4. The method as claimed in claim 3, wherein binding the logical identification information with the first identification information after the first identification information is successfully matched with the second identification information comprises:
matching the MAC address acquired from the HGW with an MAC address, which is registered by the subordinate device of the HGW in the HGW; and
when a matching result is that the MAC address acquired from the HGW is matched with the MAC address registered by the subordinate device of the HGW, binding the MAC address of the subordinate device of the HGW with the logical identification information.

5. The method as claimed in claim 1, wherein before the second identification information is acquired from the HGW, the method further comprises:
receiving the business worksheet sent by a Business Support System (BSS), wherein information carried in the business worksheet comprises: the logical identification information; and
storing the business worksheet.

6. A device for binding information, comprising:
a first receiving component, configured to receive, when a Home Gateway (HGW) is in a power-on state, first identification information from an subordinate device of the HGW;
an acquisition component, configured to acquire, when determined that the HGW executes a BOOT operation and a business worksheet corresponding to the subordinate device of the HGW exists currently, second identification information from the HGW, wherein the second identification information is relevant configuration information which is registered in the HGW when the subordinate device of the HGW is connected to the HGW in the power-on state; and
a binding component, configured to bind, after the first identification information is successfully matched with the second identification information, logical identification information of the HGW with the first identification information.

7. The device as claimed in claim 6, wherein the acquisition component comprises:
a first receiving element, configured to receive a BOOT power-on message reported by the HGW, wherein the BOOT power-on message is triggered in a case that the HGW executes the BOOT operation, and the BOOT power-on message carries a Sequence Number (SN) of the HGW;
a searching element, configured to search for the logical identification information according to the SN; and
an acquisition element, configured to acquire the business worksheet according to the logical identification information.

8. The device as claimed in claim 7, wherein the acquisition component comprises:
a sending element, configured to send an instruction for acquiring a Media Access Control (MAC) address of the subordinate device of the HGW to the HGW; and
a second receiving element, configured to receive the MAC address returned by the HGW.

9. The device as claimed in claim 8, wherein the binding component comprises:
a matching element, configured to match the MAC address acquired from the HGW with an MAC address, which is registered by the subordinate device of the HGW in the HGW; and
a binding element, configured to bind, when a matching result is that the MAC address acquired from the HGW is matched with the MAC address registered by the subordinate device of the HGW, the MAC address of the subordinate device of the HGW with the logical identification information.

10. The device as claimed in claim 6, further comprising:
a second receiving component, configured to receive the business worksheet sent by a Business Support System (BSS), wherein information carried in the business worksheet comprises: the logical identification information; and
a storage component, configured to store the business worksheet.

11. The method as claimed in claim 2, wherein before the second identification information is acquired from the HGW, the method further comprises:
receiving the business worksheet sent by a Business Support System (BSS), wherein information carried in the business worksheet comprises: the logical identification information; and
storing the business worksheet.

12. The method as claimed in claim 3, wherein before the second identification information is acquired from the HGW, the method further comprises:
receiving the business worksheet sent by a Business Support System (BSS), wherein information carried in the business worksheet comprises: the logical identification information; and
storing the business worksheet.

13. The method as claimed in claim 4, wherein before the second identification information is acquired from the HGW, the method further comprises:

receiving the business worksheet sent by a Business Support System (BSS), wherein information carried in the business worksheet comprises: the logical identification information; and storing the business worksheet.

14. The device as claimed in claim 7, further comprising:

a second receiving component, configured to receive the business worksheet sent by a Business Support System (BSS), wherein information carried in the business worksheet comprises: the logical identification information; and a storage component, configured to store the business worksheet.

15. The device as claimed in claim 8, further comprising:

a second receiving component, configured to receive the business worksheet sent by a Business Support System (BSS), wherein information carried in the business worksheet comprises: the logical identification information; and a storage component, configured to store the business worksheet.

16. The device as claimed in claim 9, further comprising:

a second receiving component, configured to receive the business worksheet sent by a Business Support System (BSS), wherein information carried in the business worksheet comprises: the logical identification information; and a storage component, configured to store the business worksheet.

\* \* \* \* \*